(12) United States Patent
McCullough et al.

(10) Patent No.: US 6,821,488 B1
(45) Date of Patent: Nov. 23, 2004

(54) SAMPLE HOLDING CHUCK FOR USE IN REACTOR AND REACTOR USING SAME

(75) Inventors: Kenneth J McCullough, Fishkill, NY (US); Wayne M Moreau, Wappingers Falls, NY (US); John P Simons, Wappingers Falls, NY (US); Charles J Taft, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 09/580,695

(22) Filed: May 30, 2000

(51) Int. Cl.[7] .............................. B01J 19/00; B01J 19/18
(52) U.S. Cl. ........................ 422/129; 422/187; 422/225; 422/239; 422/269; 422/292; 422/300; 134/149; 134/157; 134/163
(58) Field of Search ................................ 422/109, 112, 422/129, 130, 187, 198, 202, 224, 225, 226, 239, 242, 261, 269, 270, 292, 295, 297, 300; 134/137, 149, 157, 163

(56) References Cited

U.S. PATENT DOCUMENTS

| | | | | |
|---|---|---|---|---|
| 2,886,046 A | * | 5/1959 | Du Gal | 134/58 R |
| 3,727,620 A | * | 4/1973 | Orr | 134/95.2 |
| 3,986,704 A | * | 10/1976 | Risse | 366/290 |
| 5,224,503 A | * | 7/1993 | Thompson et al. | 134/95.2 |
| 5,235,995 A | * | 8/1993 | Bergman et al. | 134/105 |
| 5,526,834 A | * | 6/1996 | Mielnik et al. | 134/105 |

* cited by examiner

Primary Examiner—Hien Tran
Assistant Examiner—Jennifer A. Leung
(74) Attorney, Agent, or Firm—Daniel P. Morris; Perman & Green, LLP

(57) ABSTRACT

A chuck assembly for holding a sample includes a shaft; a generally circular chuck member, the shaft extending from a first surface of the chuck member; and a sample holder associated with a second surface of the chuck member. The second surface is opposite the first surface. A sample receiving assembly holds the sample on the sample holder so that the sample remains fixed to the sample holder when the shaft rotates and causes the chuck member and the sample holder to rotate with the shaft. The chuck assembly may be used in a reactor assembly including a reactor chamber for receiving the chuck assembly; a spindle assembly for receiving an end of the shaft distal from the chuck member; and a motor for rotating the spindle assembly and the shaft so that fluid in the chamber flows generally along the shaft in a first direction and through the openings in the chuck member, around the sample holder, and then along a wall of the chamber in a second direction generally opposite to the first direction.

25 Claims, 5 Drawing Sheets

SAMPLE HOLDING CHUCK FOR USE IN REACTOR AND REACTOR USING SAME

BACKGROUND OF THE INVENTION

1. Field of the Invention

This invention relates to a sample holding chuck for a chemical reactor and to a reactor assembly utilizing the chuck. More particularly, it relates to such a chuck which when rotated produces excellent mixing and agitation of the fluid in the reactor.

2. Background Art

In the production of semiconductor devices, small features are produced by processes involving photolithography, chemical etching, cleaning and drying. One cleaning process that has emerged as being particularly important is the use of a mixture of supercritical carbon dioxide and a co-solvent in a chemical reactor to clean articles such as semiconductor wafers that are being transformed into electronic devices.

One company that makes an apparatus in which, with suitable modifications, such cleaning operations may be performed is PARR Instruments of Moline, Illinois.

The PARR Instrument Reactor Bomb includes a shaft mounted paddle assembly which may be rotated by an external motor to stir the fluid within the vessel. A silicon chip to be cleaned may be mounted on a platform in spaced relation below the paddle. While adequate for many applications, this arrangement has the disadvantage of leaving a dead space of relatively unagitated fluid between the paddle and the wafer. For critical applications, such as the development and production of microelectronic devices, where the presence of any impurity may prove to be disastrous, this does not produce enough agitation of the fluid to adequately clean the samples. A better approach is required.

SUMMARY OF THE INVENTION

It is an object of the invention to provide an apparatus for thoroughly agitating a fluid in a chemical reaction vessel.

It is another object of the invention to provide an apparatus which efficiently carries away impurities as soon as they are removed from a sample being processed.

In accordance with the invention, a chuck assembly for holding a sample comprises a shaft; a generally circular chuck member, the shaft extending from a first surface of the chuck member; a sample holder associated with a second surface of said chuck member, the second surface being opposite the first a surface; and a sample receiving assembly for holding the sample on the sample holder so that the sample remains fixed to the sample holder when the shaft rotates and causes the chuck member and sample holder to rotate with the shaft. The chuck member has, at its periphery means for propelling a fluid. Further, the chuck member may be generally shaped as a squat cylinder with a plurality of grooves, the grooves extending along an outer surface of the cylinder, the grooves being at an acute angle with respect to a longitudinal axis of the chuck member. Further, in accordance with the invention, the chuck member has a plurality of openings extending therethrough in a direction parallel to a longitudinal axis of said chuck member.

Also in accordance with the invention, the chuck assembly may be combined with a reactor chamber for receiving the chuck assembly, a spindle assembly for receiving an end of the shaft distal from the chuck member; and a motor for rotating the spindle assembly and the shaft so that the fluid flows generally along the shaft in a first direction and through said openings in the chuck member, around said sample holder, and then along a wall of the chamber in a second direction generally opposite to the first direction. Preferably, the chamber is cylindrical and the fluid flows along a wall of the chamber in the second direction. There is preferably a first opening through which the reaction fluid is introduced into the chamber; and a second opening through which the reaction fluid is removed from said chamber. The first opening is disposed proximate the shaft and the second opening is disposed proximate the wall of the chamber.

A temperature control means is provided for controlling the temperature of the reactor chamber. The temperature control means may comprise a mantel surrounding the reactor chamber; and a controller for controlling the temperature of said mantle.

The sample receiving assembly may comprise at least one clip for holding the sample to the sample holder. The sample holder may have a plurality of through holes formed therein. At least one of the through holes receives a fastener for securing the clip to the sample holder.

The apparatus may further comprise a pressurizing apparatus for pressurizing said reactor chamber to a pressure of up to 10,000 psi.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
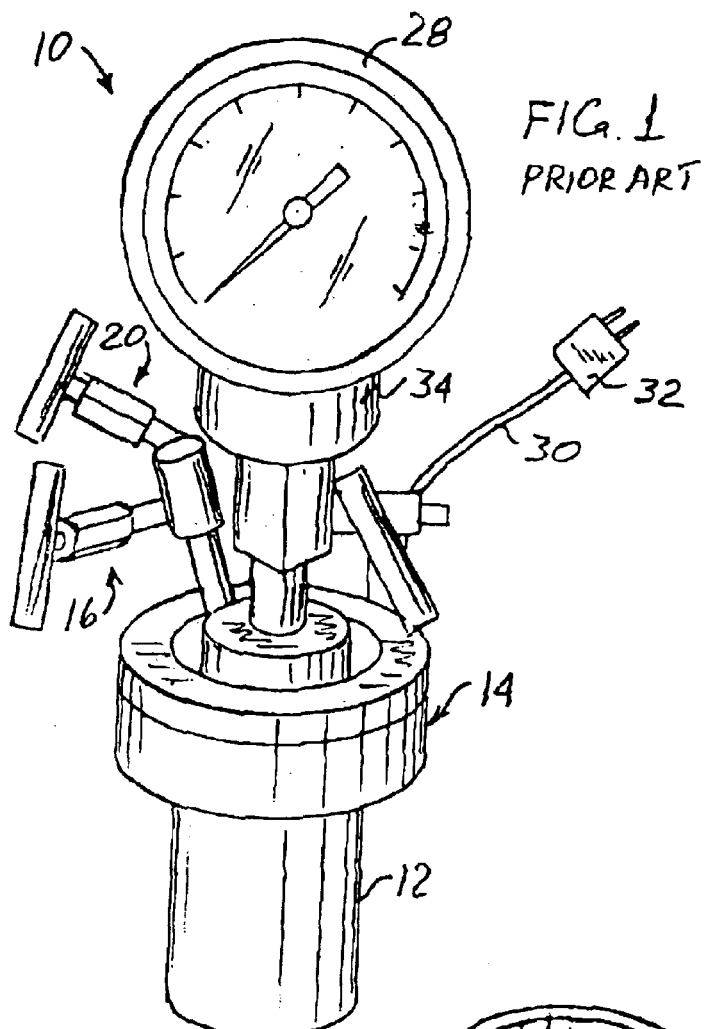
FIG. 1 is a perspective view of a prior art micro reactor vessel assembly.
Figure 2A:
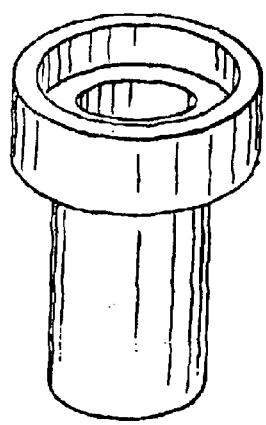
FIGS. 2A, 2B and 2C are perspective views of different sizes of prior art micro reactor cylinders usable with the prior art reactor vessel assembly of FIG. 1.
Figure 2B:
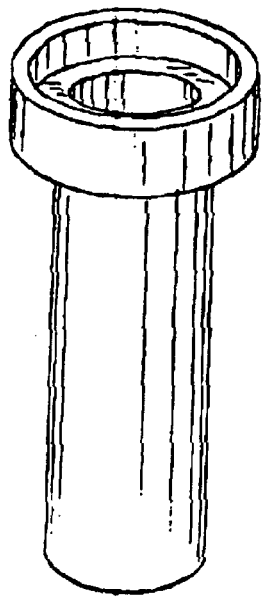
Figure 2C:
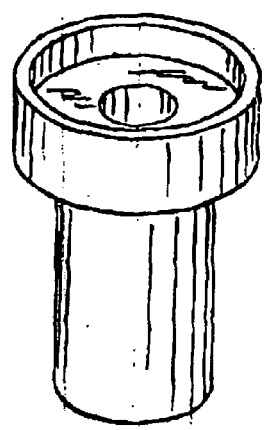

FIG. 1 illustrates a prior art micro reactor vessel assembly 10 of the type manufactured by PARR Instruments. Broadly, assembly 10 includes a reactor vessel or cylinder 12 (shown in FIG. 2A) and a vessel head 14 shown in FIG. 3. The cylinder may be any of the ones illustrated in FIG. 2A, FIG. 2B or FIG. 2C, the only difference being the chamber volumes, which, by way of example only, may define reaction chambers having volumes of 100 ml, 2.00 ml and 50 ml for FIG. 2A, FIG. 2B and FIG. 2C respectively.

Figure 4:
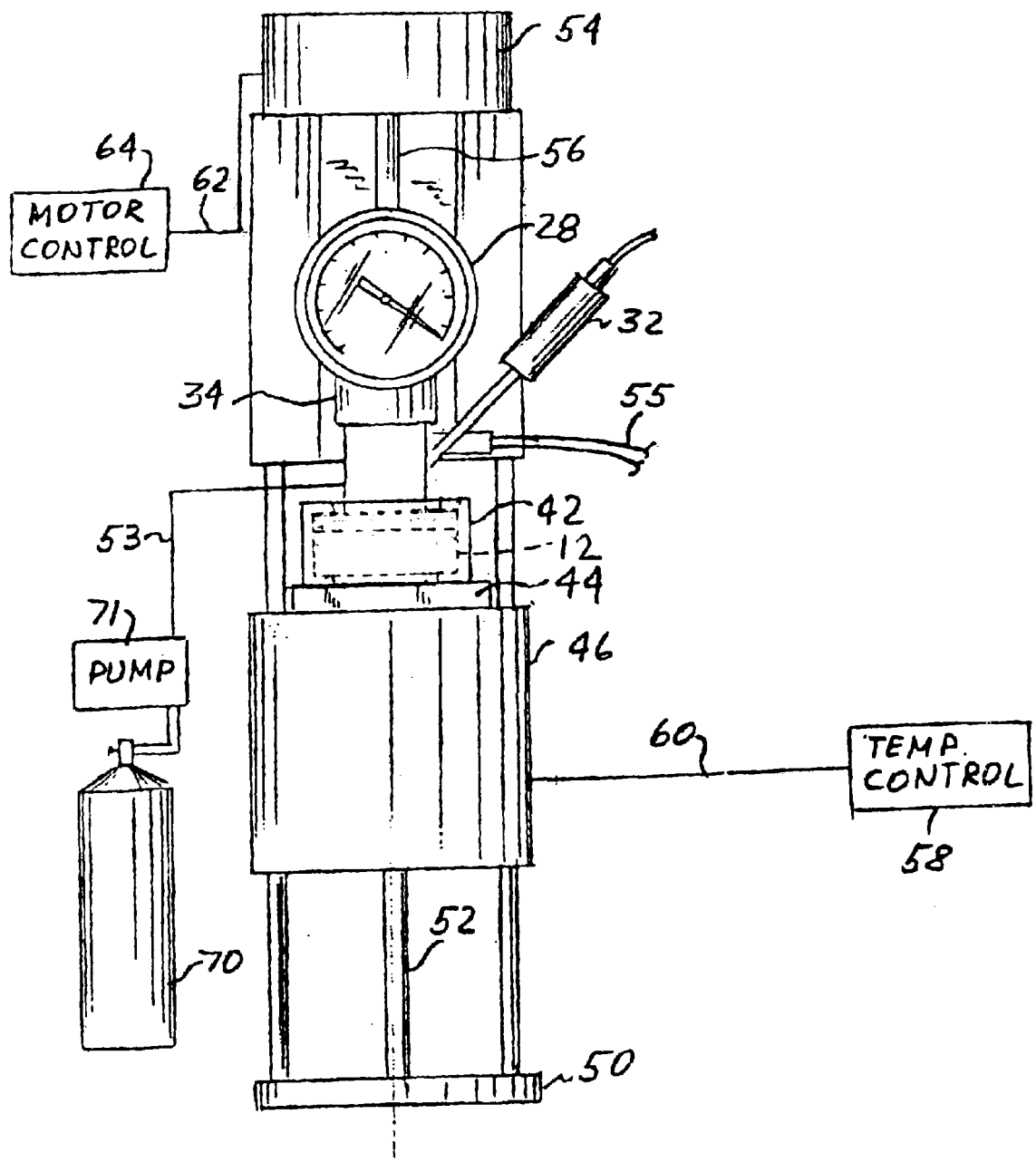
FIG. 4 is a front elevational view of the apparatus of FIG. 1 in place in a complete and operative assembly.

The cylinder 12 and head 14 are rendered pressure tight by Teflon® rings (not shown) and a clamp assembly shown in FIG. 4.

Figure 3:
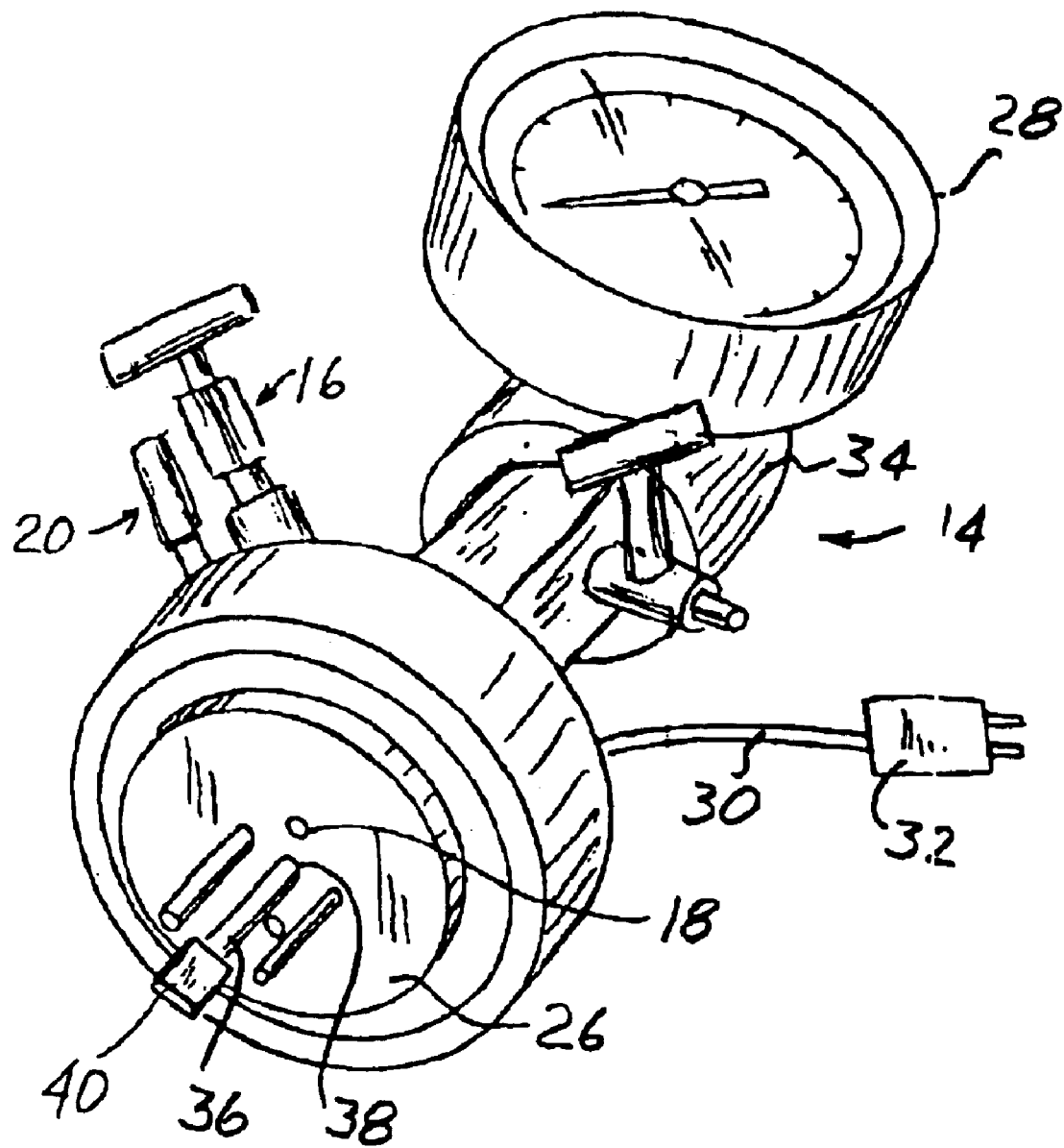
FIG. 3 is a perspective view of the prior art micro reactor head of the vessel assembly of FIG. 1.

Referring to FIG. 3 the vessel head 14 includes a first valve assembly 16 having a connection port through which a fluid used in the reaction chamber may be introduced. The fluid flows through a first passageway (not shown) in head 14 and enters the cylinder 12 through a first opening 18. A second valve assembly 20, also having a connection port, is also in communication with a second opening (not shown in FIG. 3) through a second passageway (not shown). Fluid which enters the cylinder, may then also be removed. Further, a fluid stream may be established through cylinder 12, with the fluid entering through valve assembly 16 and exiting through valve assembly 20.

Figure 5:
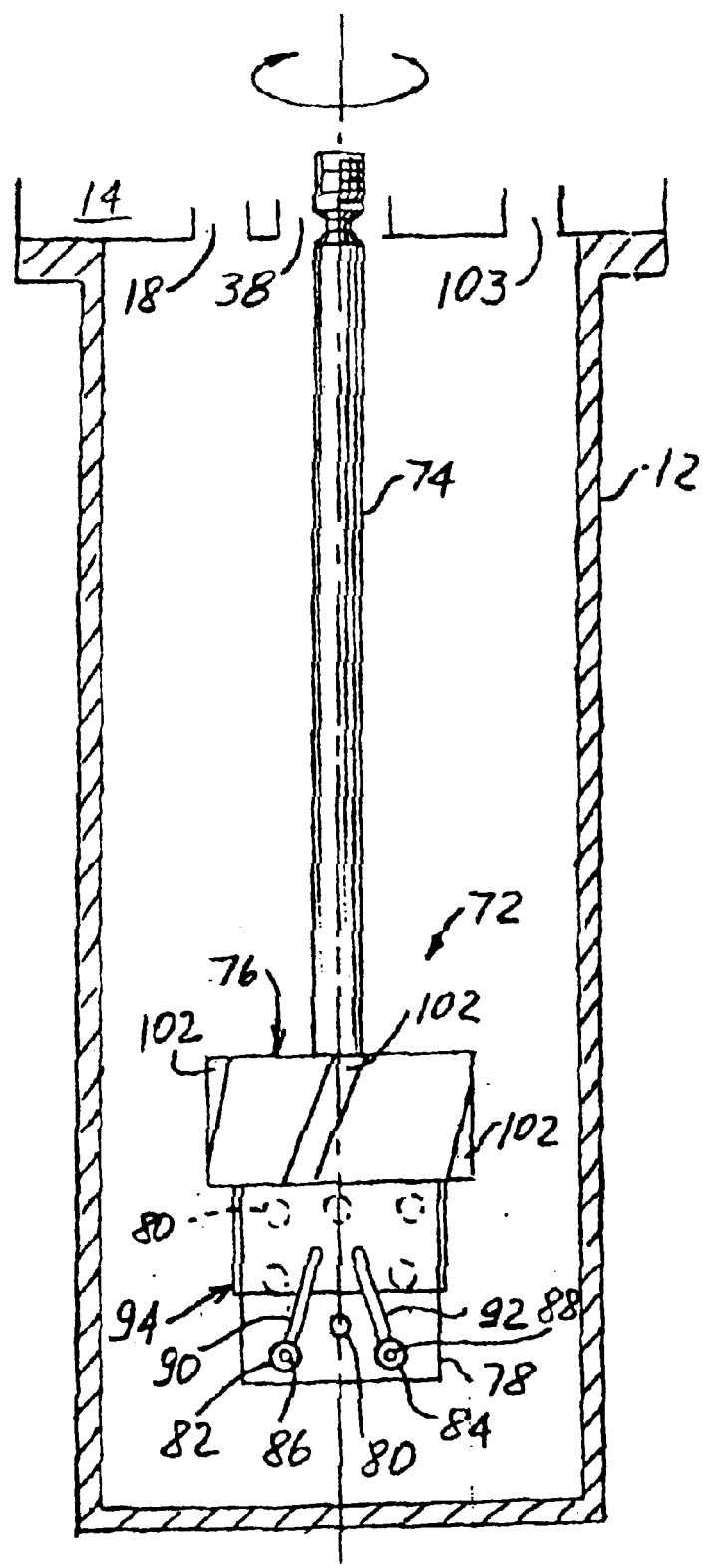
FIG. 5 is a simplified, schematic, side elevational view of the chuck assembly in accordance with the invention, as used in the assembly of FIG. 4.

For reasons that will become more apparent with respect to the description associated with FIG. 5, it is preferable that the first opening 18 be located as close as possible to the center of the bottom surface 26 of head 14. It is preferable that the second opening be located as close to the perimeter of the bottom surface of head 14 as possible.

A pressure gauge 28 is coupled to head 14 to measure the pressure within cylinder 12. A passageway (not shown) connects gauge 28 to opening 18.

Head 14 may include a thermocouple or other suitable temperature measuring device (not shown) connected by an electrical cable 30 to a connector 32. It is thus possible to monitor the temperature of head 14 and then the approximate temperature of the cylinder 12. In practice, the thermocouple may be located in the stream of fluid near opening 18 so that the temperature of fluid entering cylinder 12 is monitored.

Head 14 includes a spindle assembly 34 which may be rotated by an external motor as more fully described below. Spindle assembly 34 includes an internal shaft and appropriate pressure sealing apparatus, such as O rings for making a pressure seal (all not shown). The bottom of the internal shaft is threaded to receive an external shaft 36 which extends through an opening 38 in the bottom surface 26 of head 14 and is centrally located thereon. The distal end of shaft 36 is fitted with a paddle 40 which stirs the fluid in cylinder 12.

As noted above, for critical applications, the stirring action of paddle 40 may not be adequate to properly agitate the fluid. Further, there is no way to assure that impurities on a sample mounted on a pedestal (not shown) in cylinder 12 in spaced facing relationship with paddle 40 will have removed impurities promptly carried away, without such impurities again being deposited on the sample being cleaned.

Referring to FIG. 4, cylinder 12 and vessel head 14 are placed together with Teflon® rings (not shown) between the respective flanges thereof and clamped together by a pair of clamps 42 which are drawn toward one another by a series of screws (not shown). The screws are progressively torqued and pressure is applied to the Teflon rings to provide a high pressure seal in a manner well known in the art.

Clamps 42 are supported on a plate 44 having an opening (not shown) through which cylinder 12 extends into a temperature mantle 46. Plate 44 and mantle 46 are supported on a motor stand shown generally at 48. Motor stand 48 has a base 50 and an upright member 52 which also supports a motor assembly 54. Motor assembly 54 has a motor shaft 56 extending therefrom which rotates spindle assembly 34.

After the apparatus illustrated in FIG. 4 has been assembled as described above, a fluid inlet line 53 and a fluid outlet line 55 are connected to valve assemblies 16 and 20, respectively. A temperature measuring apparatus is coupled to connector 32. A temperature controller 58 is connected to mantle 46 by a cable 60. Mantle 46 may contain a series of thermoelectric devices, such as Peltier devices, used to control the temperature of cylinder 12, when it extends into an opening in mantle 46. It will be understood that other temperature control devices may be used. It is contemplated that operations may be conducted throughout a temperature range of at least 0° C. to 150° C.

A cable 62 connects a motor in motor assembly 54 to a motor controller 64 which may be used to control the speed of rotation of motor shaft 56. Typical rates of rotation are up to 500 rpm, but, in accordance with several of the applications contemplated for the invention, 200 rpm may be used.

To use the apparatus of FIG. 4, a source of a fluid, such as a gas cylinder 70, is connected to fluid inlet line 53. The cylinder may contain, for example, carbon dioxide which may be compressed to a super critical liquid. An appropriate solvent may be mixed in with the carbon dioxide. Using standard PARR Instruments equipment shown herein, operations may be conducted at up to 3,000 psi, although higher pressures up to 10,000 psi are contemplated. A high pressure pump 71 may be used to boost fluid pressure.

Referring to FIG. 5, in accordance with the invention, the shaft and paddle illustrated in FIG. 3 are replaced by a chuck assembly shown generally as 72. Chuck assembly 72 has a shaft 74 which is received in the internal shaft of spindle assembly 34. Shaft 74 has secured at its end a chuck member 76 which is advantageously generally in the form of a squat cylinder, but may also be a disk, as explained more fully below. A sample holder 78, in the form of a rectangular plate extends from the lower surface of chuck member 76. Sample holder 78 is formed with a plurality of through holes 80. Two of these holes 82 and 84, are threaded to receive screws 86 and 88, respectively. Screw 86 secures a clip 90, while screw 88 secures a clip 92 to sample holder 78. Clips 90 and 92 may be formed of a stiff copper alloy so that they have springy characteristics and can serve to hold a sample 94, such as a silicon wafer, which is being processed, in place on sample holder 78.

Figure 6A:
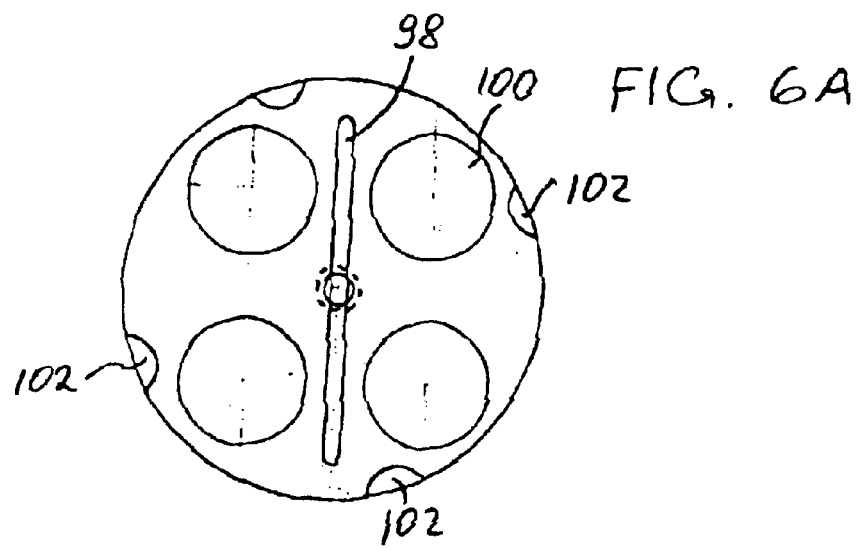
FIG. 6A is a bottom view of the chuck member of the chuck assembly of FIG. 5.
Figure 6B:
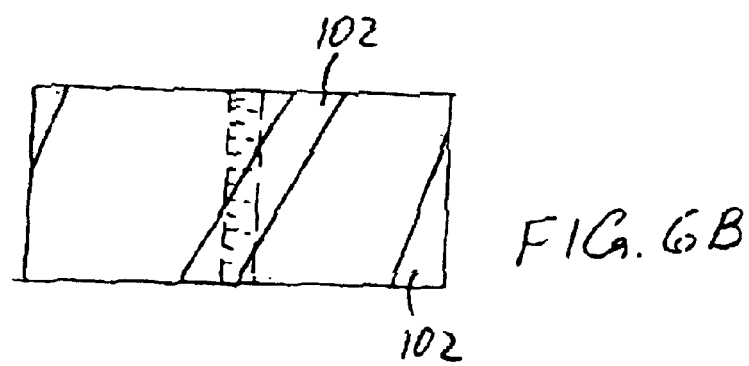
FIG. 6B is a side elevational view of the chuck member of the chuck assembly of FIG. 5.
Figure 6C:
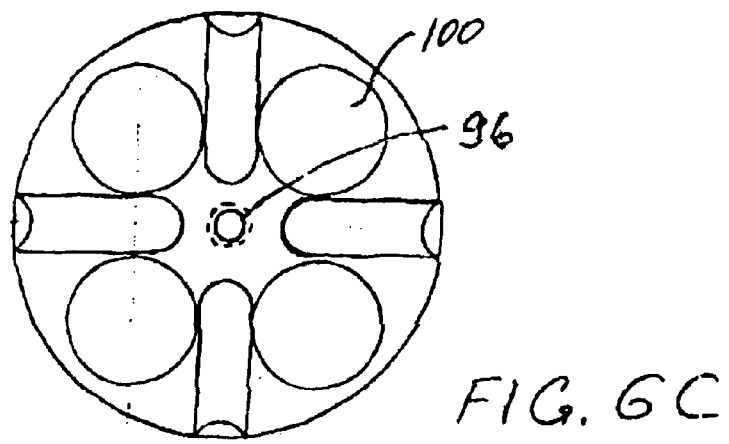
FIG. 6C is a top view of the chuck member of the chuck assembly of FIG. 5.

Referring to FIGS. 6A, 6B and 6C, chuck member 76 has a threaded hole 96 for receiving a threaded end of shaft 74. It also has, on its lower surface, a slot 98 for receiving sample holder 78, which after having an end thereof placed in slot 98, is secured to chuck member 76 by spot welding, in a manner well known in the art.

Chuck member 76 has a plurality of openings or through holes 100 formed therein, extending from the top surface to the bottom surface. As more fully described below, these through holes allow the working fluid to reach a sample secured to sample holder 78. While an array of four holes 100 is presently used, other array geometries are possible.

Chuck member 76 also has, along its outer, curved surface, a plurality of grooves 102. These grooves are angled with respect to the longitudinal axis of chuck member 76 and shaft 74 at an angle of 18 degrees, or 72 degrees from the planar surfaces of chuck member 76. While four grooves 102 are shown, it will be appreciated that any other number, but preferably at least two, may be used. One consideration in selecting the geometry of the array of holes 100 and grooves 102 is that chuck assembly 72 should be balanced for rotation about the axis of shaft 74.

Referring again to FIG. 5, grooves 102 perform the function of causing the working fluid in the cylinder 12 to be propelled in the vicinity of the cylinder wall. The diameter of chuck member 76 is chosen so that its periphery is close to, but not in contact with, the cylinder wall. A typical clearance may be in the order of 3.0 mm. Also, as in FIG. 5, if the grooves extend upward and to the right, then clockwise rotation of shaft 74 (when viewed from above), will cause fluid close to the wall of cylinder 12 to be propelled upward.

Fluid introduced through opening 18, which is in close proximity to shaft 74, will be drawn downward through openings 100. It will then pass over sample 94 in a highly agitated state, thus producing the appropriate chemical reaction or cleaning in even the most critical cases. Fluid which then contains contaminates will not remain in the vicinity of sample 94. Instead the fluid will be drawn radially outward therefrom toward the wall of cylinder 12. Upon reaching the vicinity of the wall, it will be propelled upward by the grooves 102 in member 76, which act as flutes to propel the working fluid upward along the walls of cylinder 12. Thus, in addition to the fluid being highly agitated due to the rotation of chuck member 76, and to the sample 94 being placed at the very center of such agitation, fluid which carries impurities is flung radially away from the sample and carried up the walls of cylinder 12 to be exhausted from cylinder 12 through opening 103 which is placed as close to the cylinder wall as possible. There is no dead space of relatively unagitated fluid as may arise with the use of shaft and paddle assembly of the prior art, and no impurities remain to recontaminate the sample 94.

It will be understood that various modifications of the invention will occur to those skilled in the art. For example, as noted above, the chuck member may be formed as a flat relatively thin disk, and instead of grooves, a series of impeller fingers may extend therefrom about the periphery of the disk. A sample holder may still be attached to the disk but may be configured to mount the sample to the lower surface of the disk. The fingers may extend upwardly or downwardly. Any suitable geometry may be used which thoroughly agitates the working fluid and promptly removes it from the vicinity of the sample being processed.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A chuck assembly for holding a sample comprising:
   a shaft;
   a generally circular chuck member, said shaft extending from a first surface of said chuck member, the chuck member having first fluid passages through the chuck member, the first fluid passages directing a fluid in a fluid flow through the chuck and toward the sample, the chuck member having second fluid passages through the chuck member, the second fluid passages directing the fluid away from the sample;
   a sample holder associated with a second surface of said chuck member, said second surface being opposite said first surface, said sample holder being disposed to hold the sample with a predetermined surface of the sample in a predetermined orientation relative to said fluid flow directed by said chuck member toward the sample; and
   a sample receiving assembly for holding the sample on the sample holder so that the sample remains fixed to the sample holder with the predetermined surface in the predetermined orientation when the shaft rotates and causes said chuck member and sample holder to rotate with the shaft.

2. The apparatus of claim 1 wherein said second fluid passages are located at a periphery of the chuck member, and form means for propelling the fluid.

3. The apparatus of claim 1 wherein said chuck member is generally shaped as a squat cylinder, and said second fluid passages comprise a plurality of grooves, said grooves extending along an outer surface of said cylinder, said grooves being at an acute angle with respect to a longitudinal axis of said chuck member.

4. The apparatus of claim 3 wherein said first fluid passages have a plurality of openings extending through the chuck member in a direction parallel to a longitudinal axis of said chuck member.

5. The apparatus of claim 4 in combination with:
   a reactor chamber for receiving said chuck assembly;
   a spindle assembly for receiving an end of said shaft distal from said chuck member; and
   a motor for rotating said spindle assembly and said shaft so that said fluid flows generally along said shaft in a first direction and through said openings in said chuck member around said sample holder and then along a wall of said chamber in a second direction generally opposite to said first direction.

6. The apparatus of claim 5 wherein said chamber is cylindrical and said fluid flows along a wall of said chamber in said second direction.

7. The apparatus of claim 5 further comprising:
   a first opening through which a reaction fluid is introduced into said chamber; and
   a second opening through which said reaction fluid is removed from said chamber.

8. The apparatus of claim 7 wherein said first opening is disposed proximate said shaft and said second opening is disposed proximate the wall of said chamber.

9. The apparatus of claim 5 further comprising:
   temperature control means for controlling the temperature of said reactor chamber.

10. The apparatus of claim 9 wherein said temperature control means comprises:
    a mantle surrounding said reactor chamber; and
    a controller for controlling the temperature of said mantle.

11. The apparatus of claim 9 wherein said temperature control means controls the temperature of said reactor chamber so that said reactor chamber is at a temperature of between 0° C. and 150° C.

12. The apparatus of claim 1 wherein said sample receiving assembly comprises at least one clip for holding the sample to said sample holder.

13. The apparatus of claim 12 wherein said sample holder has a plurality of through holes formed therein.

14. The apparatus of claim 13 wherein at least one of said through holes receives a fastener for securing said clip to the sample holder.

15. The apparatus of claim 5, further comprising:
    pressurizing apparatus for pressurizing said reactor chamber.

16. The apparatus of claim 15 wherein said pressurizing apparatus pressurizes said chamber to a pressure of up to 10,000 psi.

17. The apparatus of claim 15 wherein said pressurizing apparatus comprises a compressed gas cylinder.

18. The apparatus of claim 15 wherein said pressurizing apparatus includes a high pressure pump.

19. The apparatus of claim 5 wherein said fluid is supercritical carbon dioxide.

20. The apparatus of claim 19 wherein said fluid further comprises an organic solvent.

21. The apparatus of claim 1 wherein said sample holder is a rectangular plate.

22. The apparatus of claim 21 wherein said plate has a plurality of through holes formed thereon.

23. The apparatus of claim 22, wherein said sample receiving assembly comprises at least one clip for holding the sample to said sample holder.

24. The apparatus of claim 23, wherein at least one of said through holes receives a fastener for securing said clip to the sample holder.

25. An apparatus including a chuck assembly for holding a sample, and a reactor chamber for receiving said chuck assembly, said apparatus comprising:

a shaft;

said chuck assembly comprising: a generally circular chuck member connected to said shaft, said shaft extending from a first surface of said chuck member, the chuck member having first fluid passages through the chuck member, the first fluid passages directing a fluid in a fluid flow through the chuck and toward the sample, the chuck member having second fluid passages through the chuck member, the second fluid passages directing the fluid away from the samples and a sample holder associated with a second surface of said chuck member, said second surface being opposite said first surface, said sample holder being disposed to hold the sample with a predetermined surface of the sample in a predetermined orientation relative to said fluid flow directed by said chuck member toward the sample;

spindle assembly for receiving an end of said shaft distal from said chuck member; and a motor for rotating said spindle assembly and said shaft so that, when the shaft is rotated in one direction, said fluid in said chamber flows generally along said shaft in a first direction and through said first fluid passages in said chuck member around said sample holder, and in a second direction generally opposite to said first direction.

\* \* \* \* \*